(12) United States Patent
Gonzalez Garcia et al.

(10) Patent No.: US 11,180,074 B1
(45) Date of Patent: Nov. 23, 2021

(54) ACTIVE FIXATION AND RETENTION SYSTEM FOR AUTOMOTIVE HOUSING MODULE

(71) Applicant: VALEO NORTH AMERICA, INC., Troy, MI (US)

(72) Inventors: Javier Gonzalez Garcia, Troy, MI (US); Jesus Murillo, Troy, MI (US)

(73) Assignee: Valeo North America, Inc., Troy, MI (US)

( * ) Notice: Subject to any disclaimer, the term of this patent is extended or adjusted under 35 U.S.C. 154(b) by 0 days.

(21) Appl. No.: 17/121,924

(22) Filed: Dec. 15, 2020

(51) Int. Cl.
    *B60Q 1/26*     (2006.01)

(52) U.S. Cl.
    CPC .................. *B60Q 1/2615* (2013.01)

(58) Field of Classification Search
    CPC .................................................. B60Q 1/2615
    See application file for complete search history.

(56) References Cited

U.S. PATENT DOCUMENTS

| | | | |
|---|---|---|---|
| 3,474,381 A * | 10/1969 | Baldwin | B60Q 1/2615 439/36 |
| 8,726,473 B2 | 5/2014 | Dole | |
| 2019/0211853 A1 | 7/2019 | Vicino et al. | |

FOREIGN PATENT DOCUMENTS

| | | |
|---|---|---|
| DE | 102011115684 A1 | 4/2013 |
| DE | 102014112258 B4 | 7/2018 |
| FR | 2964429 A1 | 3/2012 |

* cited by examiner

Primary Examiner — Thomas M Sember
(74) Attorney, Agent, or Firm — Valeo North America, Inc.

(57) ABSTRACT

The present invention relates to an active fixation system for automotive lighting modules or component assemblies; more particularly, an active fixation system and methods dynamically apply flexible contact and clip retention arrangements for securing component modules to an automotive vehicle body efficiently that securably maintain interfaces for extended durations; the invention benefits from fastener hardware count reduction and assembly process facilitation; furthermore, the active fixation system enhances overall fit and finish to ensure proper sealing improvements that prevent external environmental or weather penetration and promote features that can effectively secure component modules beyond ordinary lifecycles under various operating conditions inclusive of vehicle vibration, component rattling and proper connection retention capabilities.

18 Claims, 5 Drawing Sheets

ACTIVE FIXATION AND RETENTION SYSTEM FOR AUTOMOTIVE HOUSING MODULE

TECHNICAL FIELD

The present invention relates to an active fixation system of lighting module. More particularly, the present invention relates to an active fixation by flexible contact and clip retention system of a lighting module for securing the lighting module to an automotive vehicle body.

BACKGROUND

An automotive vehicle comprises many components that are fixed on to the vehicle body. Conventionally, these components are fixed to the vehicle body to provide the overall styling to the vehicle interior as well as exteriors. Many functional components, such as headlamp, tail lamp etc. are also secured to the vehicle body. These components are traditionally secured using fastener hardware such as screws and bolts. They provide secure and robust connections. Fasteners are usually additional components used to secure components together. This adds additional components and weight to the overall assembly such as to a lighting module. Whereas it is desirable in the automobile industry to reduce the part count or number of components and overall weight as much as possible. In addition, the securing means via fasteners may not suitable for components that are reduced in size or on a smaller scale than currently conventional sized components e.g. currently considered small lighting assemblies and devices of a vehicle.

Alternative fixation system such as plastic clips have been conventionally used in industry for securing various components to the vehicle body. These clips are used to connect components and usually weigh less as compared to conventional fasteners. However, these methods of securing increases the assembly process and in some cases also tends to contribute issues related to the overall fit and finish of components. Improper fits of a component may result in fixing variations or exposing entry points, which may not ensure proper sealing between components to prevent penetration or ingress of external environmental elements. In addition, the fixation system needs to be durable over an extended period to provide proper connection capabilities under various operating conditions. Thus, there is a need for an active fixation system for securing automotive vehicle components such as lighting devices or assembly housings to the vehicle body by overcoming the drawbacks of prior known solutions.

The inventive concept herein overcomes multiple problems and shortcomings of the conventional fixation system and generally known associated limitations that hinder effective securing of vehicle components to the vehicle body with using such fixation systems.

The "background" description provided herein is for purposes of presenting the general context of the disclosure. Work of the presently named inventors, to the extent it is described in this background section, as well as aspects of the description, which may not otherwise qualify as conventional art at the time of filing, are neither expressly nor impliedly admitted as conventional art against the present disclosure.

SUMMARY

The present invention is directed to a unique solution that addresses at least one or more of the described issues in paragraphs above. It is believed that the fixation system of the present invention can effectively secure a vehicle component such as a lighting device component or automotive housing module to the vehicle body and achieve the objectives by reducing the fixing variation between the components to promote and ensure proper fit and finish. Furthermore, the proposed fixation system can secure the vehicle component efficiently and securably extend duration. In addition, the present invention's fixation system can effectively secure the vehicle component under various operating conditions such as vehicle vibration and prevent the rattling of components.

Accordingly pursuant to a first aspect of the present invention, there is contemplated an active fixation system of a lighting module for securing the lighting module to an automotive body comprising at least one locking member integrally formed on a housing of the lighting module that may be adapted to engage with a structural element of the automotive body, the at least one locking member comprising at least one locking arm arranged on the housing on a first axis that extends in a transverse direction, the at least one locking member may be configured to engage the lighting module with the structural element, the active fixation system further comprises at least one abutment member arranged on a second axis that is different from the first axis, and the at least one member protruding from the housing to extend towards the at least one locking arm, wherein the at least one abutment member is adapted to engage with the structural element and is configured to prevent translation of the lighting module during operation.

The invention may be further characterized by any one or any combination of the features described herein, such as; wherein the at least one locking arm and the at least one abutment member are adapted to engage opposing sides of the structural element, wherein the second axis is perpendicular to the first axis on the housing, wherein the at least one locking arm is flexible and configured to move in longitudinal direction during assembly, wherein the at least one locking arm comprises a locking head that is integrally formed on the locking arm, wherein the locking head is of triangular shape, wherein the locking head is of semicircular shape.

The invention may be further characterized by a one or any combination of the features described herein, such as; wherein the at least one abutment member is having a curvilinear shape, wherein the at least one abutment member is having a curvilinear shape, wherein the abutting ridge is of semi spherical shape, wherein the abutting ridge is conical in shape, wherein the automotive vehicle body is tangential to the abutting ridge of the at least one abutment member, wherein the at least one abutment member is configured to be flexible in vertical direction.

Accordingly pursuant to a second aspect of the present invention, contemplated is an active fixation system of an automotive lighting device for affixing a lighting module to an automotive body comprising at least one locking member that is integrally formed on a housing of the lighting module, the at least one locking member adapted to engage with a structural element of the automotive body, the locking member comprising at least one pair of locking arms arranged on the housing on a first axis where the at least one pair of locking arms extend in a transverse direction that are configured to engage the lighting module with the structural element of the automotive body, wherein the at least one pair of locking arms may be arranged facing each other, the active fixation system further comprises at least one abutment member arranged on a second axis that may be different from the first axis where the at least one abutment member protrudes from the housing and extends towards the at least one locking arm, wherein the at least one abutment member may be adapted to engage with the structural element of the automotive body and may be configured to prevent the translation of the lighting module when the at least one abutment member and the structural element are fully engaged or completely interface.

The invention may be further characterized by one or any combination of the features described herein, such as; wherein each of the locking arms are configured to move away from each other in longitudinal direction during assembly, wherein the fixation system further comprises a gasket on the housing that is configured to hermetically seal from moisture and weathering elements between the lighting module and the automotive body upon interface assembly, wherein the gasket is provided outside of the fixation region on the housing.

Accordingly pursuant to a third aspect of the present invention, contemplated is a lamp of an automotive vehicle comprising a housing, at least one light source configured to produce a light beam, at least one optical element to receive the light beam the at least one light source that is adapted to project the light beam outside of the lamp, and an active fixation system for securely affixing the lamp onto a structural element of the automotive vehicle, said system further comprising at least one locking member that is integrally formed on a housing of the lighting module, the at least one locking member adapted to engage with a structural element of the automotive vehicle, the locking member further comprising at least one locking arm that is arranged on the housing on a first axis and where the at least one locking arm extends along a transverse direction where the at least one locking arm is configured to engage the lighting module with the structural element of the automotive vehicle; and at least one abutment member is arranged on a second axis that is different from the first axis, the at least one abutment member protruding from the housing to extend towards the at least one locking arm, wherein the at least one abutment member is adapted to engage with the structural element of the automotive vehicle and prevents translation of the lighting module during upon installation.

It should be appreciated that the above referenced aspects and examples are non-limiting, as other aspects exist within the present invention, as shown and described herein.

BRIEF DESCRIPTION OF THE DRAWINGS

To further provide a more encompassing description and a better understanding of the invention, a set of drawings is provided. Said drawings form an integral part of the description and illustrate embodiment aspects of the invention, which should not be construed as restricting the scope of the invention, but only as examples of how the invention can be carried out. The drawings comprise the following characteristics.

DETAILED DESCRIPTION

An automotive vehicle component includes various components that are attached or secured to the vehicle body. It is paramount that these components are secured to the vehicle body properly, especially lighting device component housings. Lighting devices need to meet various regulations at all times and under all driving conditions. For this purpose, fixation systems have been used to secure lighting devices to the vehicle body. The fixation system needs to ensure proper fit and finish of the lighting device interfaces or with vehicle component structures. The proposed fixation system can secure the vehicle component efficiently and securably for extended durations. In addition, the present invention's fixation system can effectively secure the vehicle component under various operating conditions such as vehicle vibration and can prevent rattling of the components.

The present invention provides an active fixation system of a lighting module for securing the lighting module to an automotive body that can reduce the interface variations and facilitate the assembly process.

Unless otherwise defined, all technical and scientific terms used herein have the same meaning as commonly understood by one of ordinary skill in the art to which this technology belongs.

Figure 1A:
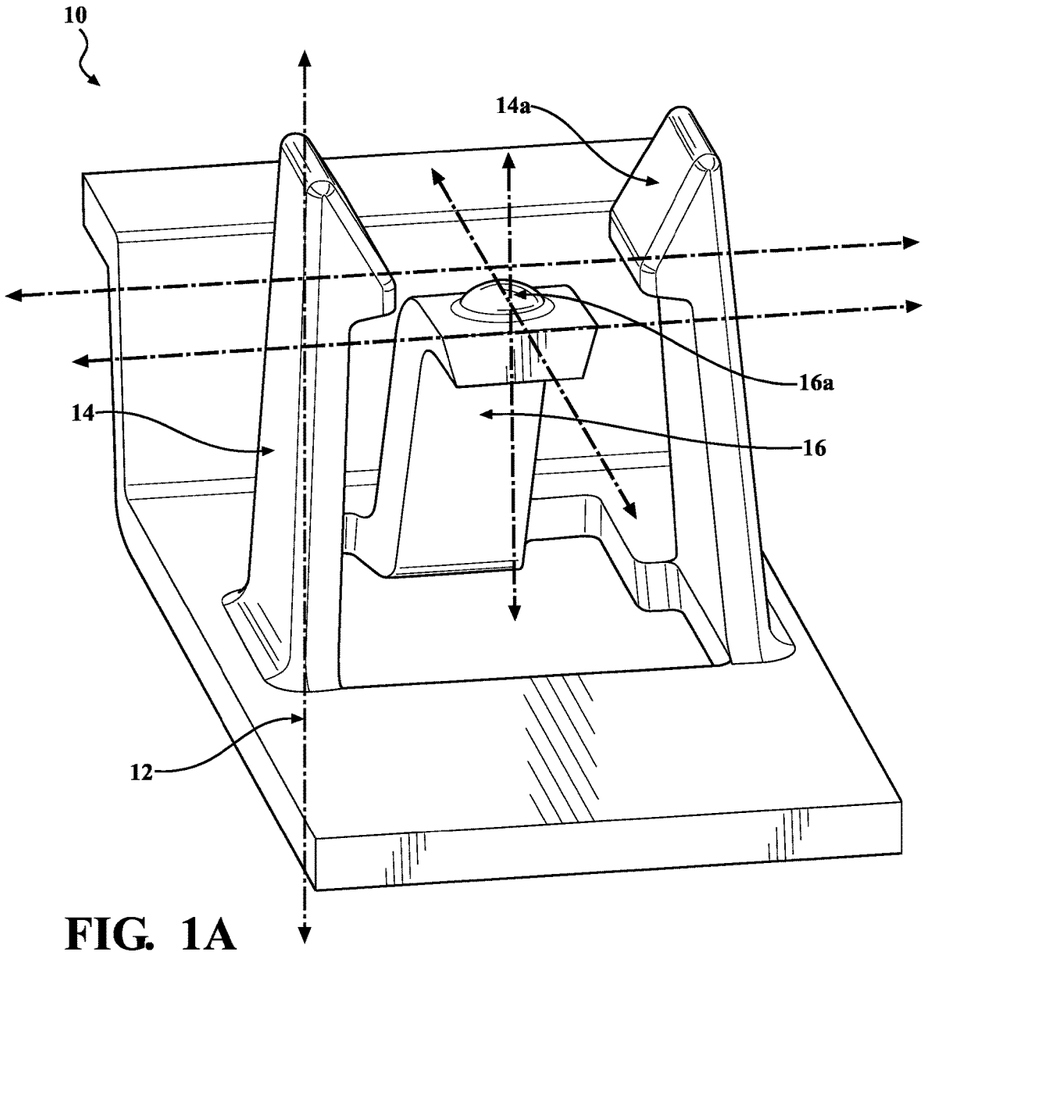
FIG. 1A shows a perspective view of flexible contact engagement retention features of the active fixation system, according to an embodiment of the present invention.

Of particular interest and a main focus of the present disclosure is to provide an active fixation system of a lighting module for securing lighting modules to an automotive body as shown in FIGS. 1A through 3. FIG. 1A and FIG. 1B show features of the fixation system, according to an embodiment of the present invention. Active fixation system 100 shown in FIG. 2A comprises at least one locking member 10 integrally formed on a housing 12. FIG. 2B illustrates a preferred embodiment of locating multiple units of locking member 10 at delineated locations along housing structure 12, by example. As shown, FIG. 1B illustrates features that at least one locking member 10 comprises at least one locking arm 14 and at least one abutment member 16.

The at least one locking member 10 of active fixation system 100 may be integrally formed on a housing 12 of the lighting module or vehicle component 50. Furthermore, the at least one locking member 10 may be adapted to engage with structural element 30 (refer FIG. 3) of an automotive body 1. The at least one locking member 10 comprises at least one locking arm 14 arranged on the housing 12 on a first axis 21 that extends in a transverse direction 42. The at least one locking arm 14 may be configured to engage the lighting module's or vehicle component's housing 12 with the structural element 30. The at least one locking member 10 further comprises at least one abutment member 16 arranged on a second axis 22 that may be different from the first axis. The at least one abutment member 16 may protrude from the housing 12 to extend towards the at least one locking arm 14. Further, the at least one abutment member 16 may be adapted to engage with the structural element 30 and may be configured to prevent translation of the lighting module or vehicle component 50 during operation.

It is contemplated that the relationship between components and corresponding component assemblies are surprisingly important in solving one or more issues described in the background section above. Each of the components and associated assemblies and their relationships are disclosed in greater detail and specificity by the following paragraphs.

Locking Member 10

Locking member 10 represents device that mechanically joins or affixes two or more objects together. In general, locking members are used to create non-permanent joints that can be removed or dismantled without damaging the joining components if needed. In some cases, the locking members can be used to create permanent joint as well. Usually, locking members are provided as separable parts but in some cases can be integrally formed within the objects that need to be joined.

Housing 12

A housing 12 represents an exterior case or enclosure used to protect an interior mechanism of a device. The housing may include fittings or brackets to assemble the components in place. The housing prevents the interior mechanism from being fouled by outside debris or to contain the internal components. A Housing may be the body of the device, vital to its function. In addition, the housing may be include provisions to allow the device to connect to another component.

Locking Arm 14

A locking arm 14 represents a mechanical structure usually having two ends. Locking arms usually form a cantilever beam-like structure where one end is a fixed and connected to a component. The other end that is free is usually adapted to interface, secure, retain or attach onto another component. In some cases, locking arms may have two free ends that are both adapted to interface, secure, retain, or attach to different components. Conventionally, the end that is adapted to interface, secure, retain or attach to different components includes a means to enable the attachment. The means to enable the attachment is broadly known or referenced as locking head 14a.

Abutment Member 16

Abutment member represents a structure built to support the lateral pressure of an interfacing component. Abutment members are usually secondary members that help in overall locking of the component. They are generally used to restrict the movement of the assembled component in a lateral direction. Sometimes, the abutment member is provided with provisions that are adapted to contact a component for providing support, these provisions may be referred to as abutment head 16a.

Structural Element 30

Structural element 30 represents a reference supporting structure of a vehicle, to which all other components are attached. Typically, such structural elements are made of metal and are made into specific shapes by stamping or using a punching press. Such analogous structural elements are made of high strength material to withstand and support the weight of the entire component and provide strength and structure to the vehicle. These structural elements generally include provisions to attach various components such as lighting devices.

Figure 2A:
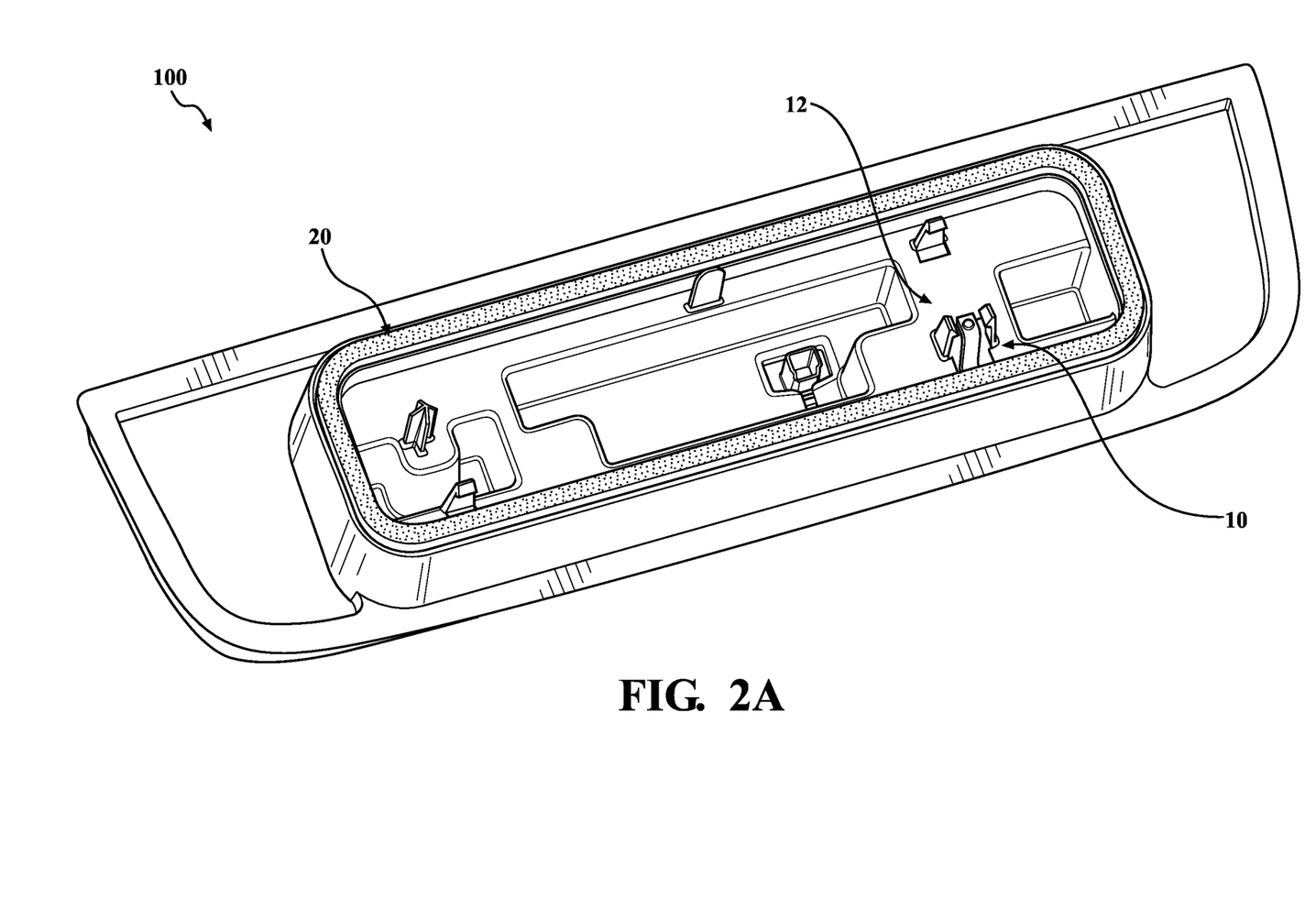
FIG. 2A shows an isometric view of a single unit installation of the active fixation system on a vehicle component housing according to another embodiment of the present invention.
Figure 2B:
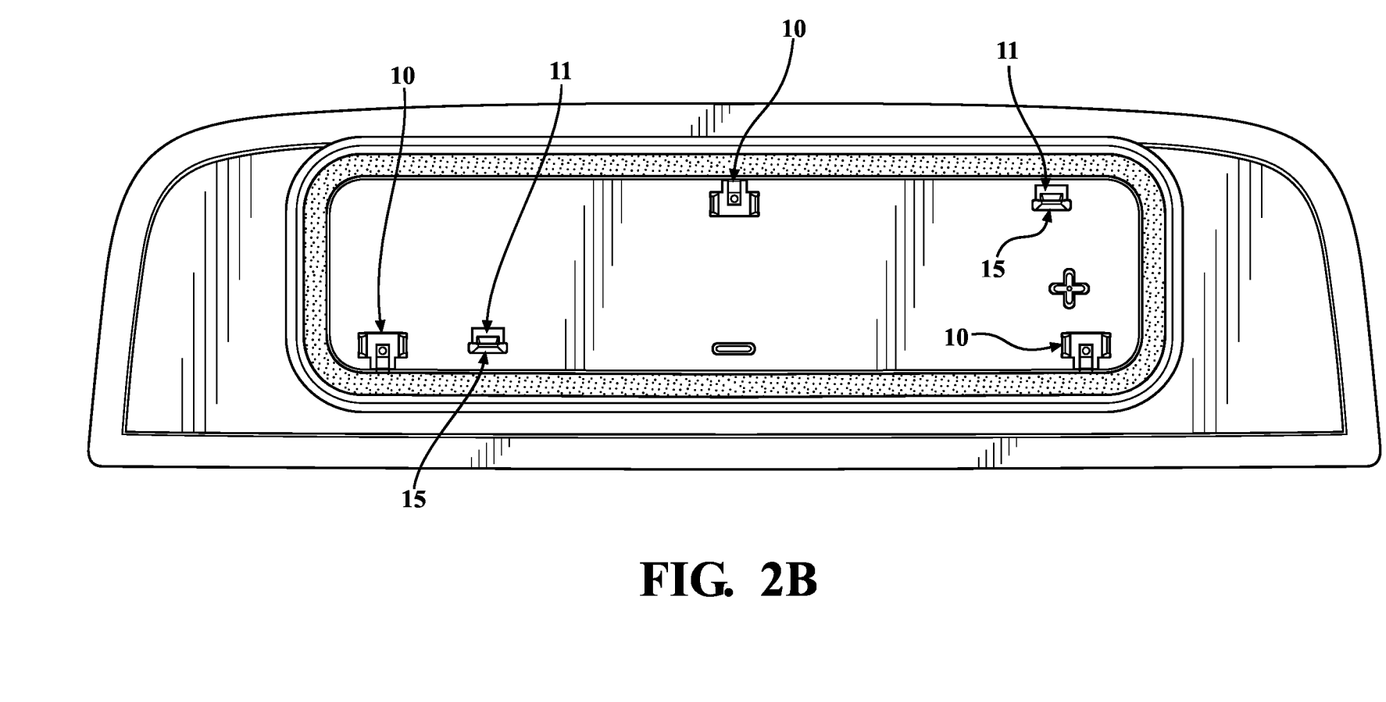
FIG. 2B shows a top planform view of proposed multiple unit locations of the active fixation system according to FIG. 2A's embodiment.
Figure 3:
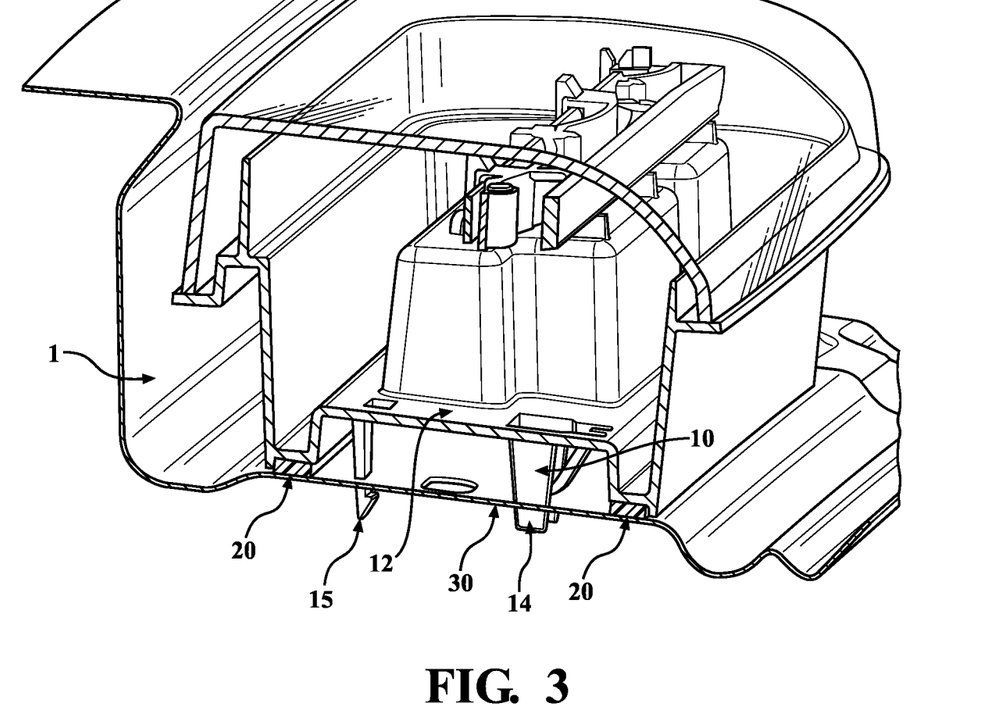
FIG. 3 shows a sectional perspective view of the active fixation system as applied in a component housing assembly, according to another embodiment of the present invention.

In an embodiment, active fixation device 100 of a lighting module for securing the lighting module to an automotive body of the present invention may be provided with at least one locking member 10. The at least one locking member 10 may be configured to secure the lighting module to structural element 30 of a vehicle body. As seen in FIG. 2A, at least one locking member 10 is provided on the rear of the vehicle lighting module. In the FIG. 2A, only one such locking member is shown; however, a number of more locking members may be provided based on design requirements. Furthermore as indicated, at least one locking member 10 of the active fixation system 100 of the present invention is provided at the rear to enable securing the lighting device to the structural element 30 of the vehicle body in a longitudinal direction 41 of the vehicle. In FIG. 3, the cut sectional view of the lighting device is shown. FIG. 3 shows the assembly of the lighting device to the structural element 30 of the vehicle body.

In an embodiment of the present invention, at least one locking member 10 integrally formed on a housing of the lighting module may be adapted to engage with a structural element 30 of the automotive body, the at least one locking member 10 of the active fixation device 100 comprises at least one locking arm 14. The at least one locking arm 14 may be arranged on the housing 12 on a first axis. Further, the at least one locking arm 14 may extend in a transverse direction 42 and may be configured to engage the lighting module with the structural element 30. As seen in FIG. 3, at least one locking arm 14 may extend from the housing 12 to enable the fixation system to reach the structural element 20 to maintain the design tolerance. The length of the at least one locking arm 14 may depend on the design requirement and the specification of the lighting device. At least one locking member 10 further comprises at least one abutment member 16 arranged on a second axis 22 that is different from the first axis 21. The at least one abutment member 16 may protrude from the housing 12 to extend towards the at least one locking arm 14. Furthermore, at least one abutment member 16 may be adapted to engage with the structural element 20 and may be configured to prevent translation of the lighting module during operation.

In an embodiment, at least one locking arm 14 may be flexible and configured to move in longitudinal direction 41 during assembly. Furthermore, at least one locking arm 14 may comprise a locking head 14a that may be integrally formed on the locking arm 14. The locking head 14a may be formed on the end that is farther from the housing 12. In addition, the structural element 30 may be further configured to include a provision adapted engage with the at least one locking arm 14 of the at least one locking member. Locking head 14a of the at least one locking arm 14 may be adapted to engage with the said provision of the structural element 30 such that the locking head 14a passes through the said provision to engage structural element 30. To enable the engagement, locking head 14a may triangular in shape in an embodiment. In an alternate embodiment, locking head 14a may be of semi-circular shape (described but not shown). Other shapes can also be used that enable locking head 14a to meet the above-mentioned objective.

Figure 1B:
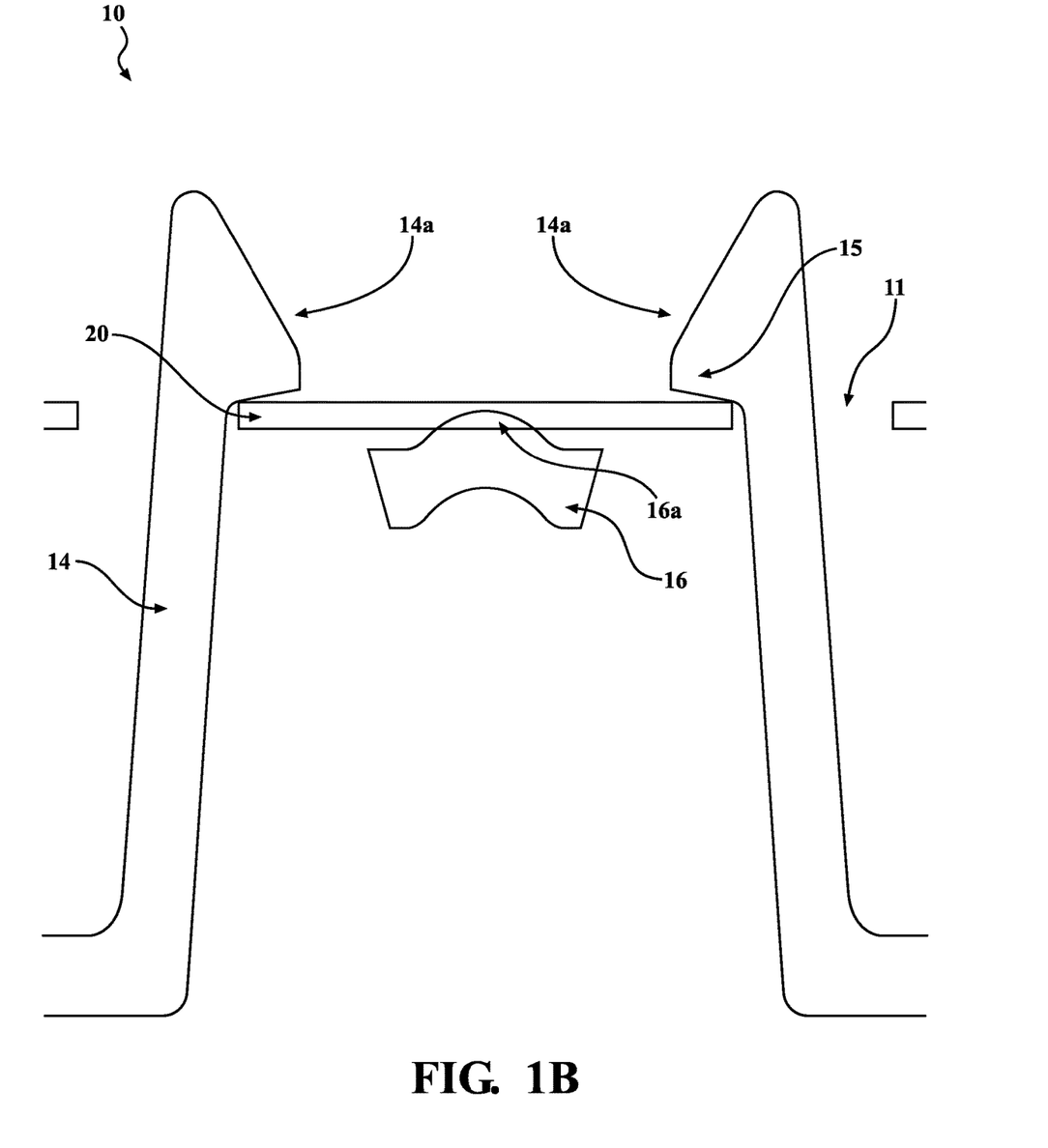
FIG. 1B shows a cut section view of FIG. 1's active fixation system, according to an embodiment of the present invention.

In an embodiment, at least one abutment member 16 may be having a curvilinear shape. Furthermore, at least one abutment member 16 comprises an abutting ridge 16a adapted to engage structural element 30 of the automotive vehicle body. As seen in FIG. 1B, abutting ridge 16a provided on abutting member 16 may be adapted to on provide at least a one point contact between structural element 30 and the abutting member 16. The one point of contact between the two contact features prevents rattling during harsh vehicle operating conditions such as vehicle vibration. Furthermore, structural element 30 of the automotive vehicle body may be arranged tangential to abutting ridge 16a of the feature of at least one abutment member 16. Abutting ridge 16a of the present invention may be of semi spherical shape or may be conical in shape in alternate embodiments. Other shapes of the abutting ridge 16a can be devised that may provide single points of contact between abutting ridge 16a and structural element 30.

Furthermore, at least one abutment member 16 may be designed to have lesser height than the at least one locking arm 14. Furthermore, at least one locking arm 14 and at least one abutment member 16 may be adapted to engage opposing sides of structural element 30. The different heights of the locking arm 14 and the abutment member enable the at least one locking member to achieve the above stated objective. Furthermore, a second axis 22 may be perpendicular to the first axis 21 on the housing. As seen in FIG. 1A, different axis orientations of the at least one locking arm 14 and the at least one abutment member 16 enables them to be placed substantially perpendicular to each other and at a distance.

In another embodiment for assembling the lighting device to structural element 30 of the vehicle body, the active fixation system of the present invention may be used. During assembly, structural element 30 exerts an insertion force on the locking head 14a of the at least one locking arm 14. Due to the insertion force the at least one locking arm 14 may move is longitudinal direction 41. Locking head 14a may be designed such that the profile of the locking head is directly proportional to the insertion force. Furthermore, locking head 14a may be designed such that the reactive forces is on locking head 14a are easily overcome by the insertion force. Once locking head 14a of the at least one locking arm 14 passes through the provision of the structural element 30, locking arm 14 returns to its original position and effectively locks to structural element 30.

In another embodiment of the invention, an active fixation system 100 of an automotive lighting device for affixing a lighting module to an automotive body may comprise at least one locking member 10 that is integrally formed on a housing of the lighting module. At least one locking member 10 may be adapted to engage with a structural element 30 of the automotive body. As shown in FIG. 1A, locking member 10 may further comprise at least one pair of locking arms 14 arranged on the housing on a first axis 21 where the at least one pair of locking arms 14 extends in a transverse direction 42. The at least one pair of locking arms 14 may be configured to engage the lighting module with the structural element 30 of the automotive body. In a preferred embodiment, the at least one pair of locking arms 14 may be arranged facing each other. Further, the at least one locking member 10 may comprise at least one abutment member 16 arranged on a second axis 22 that is different from the first axis 21. The at least one abutment member 16 may protrude from the housing 12 and extends towards the at least one locking arm 14. At least one abutment member 16 may be adapted to engage with the structural element 30 of the automotive body and may be configured to prevent the translation of the lighting module when the at least one abutment member and the structural element are fully engaged or completely interface.

Gasket 20

A gasket represents a mechanical sealing function that fills the space between two or more mating surfaces or at an interface. Generally, gaskets are used to prevent leakage from or into joined objects while under compression. Gaskets allow for less than perfect mating surfaces on machine parts and are used to adjust irregularities. Gaskets are commonly produced by cutting from sheet materials.

In an embodiment, wherein each of the locking arms 14 may be configured to move away from each other in longitudinal direction 41 during assembly. The movement of the locking arms 14 may be as the result of insertion force during assembly. As discussed earlier, the locking arms 14 may return to their original position once the locking head 14a of the locking arms are locked to the structural element 30. In addition, the fixation system 100 may further comprise a gasket 20 on the housing 12. The gasket 20 may be configured to hermetically seal from moisture and weathering elements between the lighting module and the automotive body upon interface assembly. Furthermore, the gasket 20 may be provided outside of the fixation region on the housing 12. The location of the gasket 20 enables a proper sealing and prevents entry of any elements inside the lighting device through the locking member 14.

In another embodiment of the invention, it is contemplated a lamp of an automotive vehicle. The lamp may comprises a housing 12, at least one light source configured to produce a light beam, at least one optical element to receive the light beam the at least one light source that is adapted to project the light beam outside of the lamp and an active fixation system 100 for securely affixing the lamp onto a structural element 30 of the automotive vehicle. The said active fixation system further comprises at least one locking member 14 that is integrally formed on a housing of the lighting module. The at least one locking member 14 may be adapted to engage with a structural element 30 of the automotive vehicle. The locking member further comprises at least one locking arm 14 that is arranged on the housing 12 on a first axis 21. The least one locking arm 14 may extends along a transverse direction 42. The at least one locking arm 14 may be configured to engage the lighting module with the structural element 30 of the automotive vehicle. Furthermore, the locking member 10 comprises at least one abutment member 16 arranged on a second axis 22 that is different from the first axis 21. The at least one abutment member 16 may protrude from the housing 12 to extend towards the at least one locking arm 14. In addition, the at least one abutment member 16 is adapted to engage with the structural element 30 of the automotive vehicle and prevents translation of the lighting module during upon installation.

In an embodiment, the active fixation system may be made of the same material as that of the housing of the lighting device. In another embodiment, the material of the active fixation system may be different from the housing 12 of the lighting device. The material used may be AVS, AVS PC, ASA or material having similar properties.

Although the present disclosure provides references to figures, all embodiments shown in the figures are intended to explain preferred embodiments of the present invention by way of example rather than being intended to limit the present invention. Preferred embodiments of the present invention have been disclosed. However, it should be apparent to a person of ordinary skill in the art that certain modifications would come within the teachings of this invention and that various changes or modifications may be made in the present disclosure without departing from the principles and spirit of the disclosure, which are intended to be covered by the present invention as long as these changes or modifications fall within the scope defined in the claims and their equivalents.

LIST OF ELEMENT NUMBERS

Locking member 10
Housing structure 12
Locking arm 14
Locking head 14a

Abutment member 16
Abutment ridge 16a
Gasket 20
Structural element 30
Retention Prong 15
Assembly Cover 40
Panel Structure-Automotive Body 1
First Axis 21
Second Axis 22
Longitudinal Direction 41
Transverse Direction 42
Vehicle Component or Lighting Module 50
Insertion Relief 11

What is claimed is:

1. An active fixation system of a lighting module for securing the lighting module to an automotive body, said system comprising:
  at least one locking member integrally formed on a housing of the lighting module that is adapted to engage with a structural element of the automotive body, the at least one locking member comprising
  at least two locking arms arranged on the housing on a first axis that extends in a transverse direction and are configured to engage the lighting module with the structural element; and
  at least one abutment member arranged on a second axis that is different from the first axis, and the at least one member protruding from the housing to extend towards the at two locking arms, wherein the at least one abutment member is adapted to engage with the structural element, is positioned between the at least two locking arms, and is configured to prevent translation of the lighting module during operation.

2. The fixation system of claim 1, wherein the at least two locking arms and the at least one abutment member are adapted to engage opposing sides of the structural element.

3. The fixation system of claim 1, wherein the second axis is perpendicular to the first axis on the housing.

4. The fixation system of claim 1, wherein the at least two locking arms are flexible and configured to move in longitudinal direction during assembly.

5. The fixation system of claim 1, wherein each of the at least two locking arms comprises a locking head that is integrally formed on the locking arm.

6. The fixation system of claim 5, wherein the locking head is of triangular shape.

7. The fixation system of claim 5, wherein the locking head is of semi-circular shape.

8. The fixation system of claim 1, wherein the at least one abutment member is having a curvilinear shape.

9. The fixation system of claim 1, wherein the at least one abutment member comprises an abutting ridge adapted to engage the structural element of the automotive vehicle body.

10. The fixation system of claim 9, wherein the abutting ridge is of semi spherical shape.

11. The fixation system of claim 9, wherein the abutting ridge is conical in shape.

12. The fixation system of claim 11, wherein the automotive vehicle body is tangential to the abutting ridge of the at least one abutment member.

13. The fixation system of claim 1, wherein the at least one abutment member is configured to be flexible in vertical direction.

14. The fixation system of claim 1, wherein the fixation system further comprises a gasket on the housing that is configured to hermetically seal from moisture and weathering elements between the lighting module and the automotive body upon interface assembly.

15. The fixation system of claim 14, wherein the gasket is provided outside of the fixation system on the housing.

16. An active fixation system of an automotive lighting device for affixing a lighting module to an automotive body, the fixation system comprising
  at least one locking member that is integrally formed on a housing of the lighting module, the at least one locking member adapted to engage with a structural element of the automotive body, the locking member comprising
  at least one pair of locking arms arranged on the housing on a first axis where the at least one pair of locking arms extend in a transverse direction that are configured to engage the lighting module with the structural element of the automotive body, wherein the at least one pair of locking arms is arranged facing each other; and
  at least one abutment member arranged on a second axis that is different from the first axis where the at least one abutment member protrudes from the housing and extends towards the at least one pair of locking arms, wherein the at least one abutment member is adapted to engage with the structural element of the automotive body, is positioned between the at least one pair of locking arms, and is configured to prevent the translation of the lighting module when the at least one abutment member and the structural element are fully engaged or completely interface.

17. The fixation system of claim 16, wherein each of the locking arms are configured to move away from each other in longitudinal direction during assembly.

18. A lamp of an automotive vehicle comprising:
  a housing;
  at least one light source configured to produce a light beam;
  at least one optical element to receive the light beam the at least one light source that is adapted to project the light beam outside of the lamp; and
  an active fixation system for securely affixing the lamp onto a structural element of the automotive vehicle, said system further comprising
  at least one locking member that is integrally formed on the housing of the lamp, the at least one locking member adapted to engage with a structural element of the automotive vehicle, the locking member further comprising
  at least two locking arms that are arranged on the housing on a first axis and where the at least two locking arms extend along a transverse direction where the at least two locking arms are configured to engage the lighting module with the structural element of the automotive vehicle; and
  at least one abutment member is arranged on a second axis that is different from the first axis, the at least one abutment member protruding from the housing to extend towards the at least one locking arm, wherein the at least one abutment member is adapted to engage with the structural element of the automotive vehicle, is positioned between the at least two locking arms, and prevents translation of the lighting module during upon installation.

* * * * *

UNITED STATES PATENT AND TRADEMARK OFFICE
CERTIFICATE OF CORRECTION

PATENT NO.        : 11,180,074 B1
APPLICATION NO.   : 17/121924
DATED             : November 23, 2021
INVENTOR(S)       : Gonzalez Garcia et al.

Page 1 of 1

It is certified that error appears in the above-identified patent and that said Letters Patent is hereby corrected as shown below:

In the Claims

Column 9, Claim 1, Line 28:
Replace "member protruding from" with --abutment member protruding from--

Column 9, Claim 1, Line 29:
Replace "the at two locking arms," with --the at least two locking arms,--

Column 10, Claim 18, Line 58:
Replace "the at least one locking arm" with --the at least two locking arms--

Signed and Sealed this
Fourth Day of January, 2022

Drew Hirshfeld
*Performing the Functions and Duties of the*
*Under Secretary of Commerce for Intellectual Property and*
*Director of the United States Patent and Trademark Office*